United States Patent Office 3,846,234
Patented Nov. 5, 1974

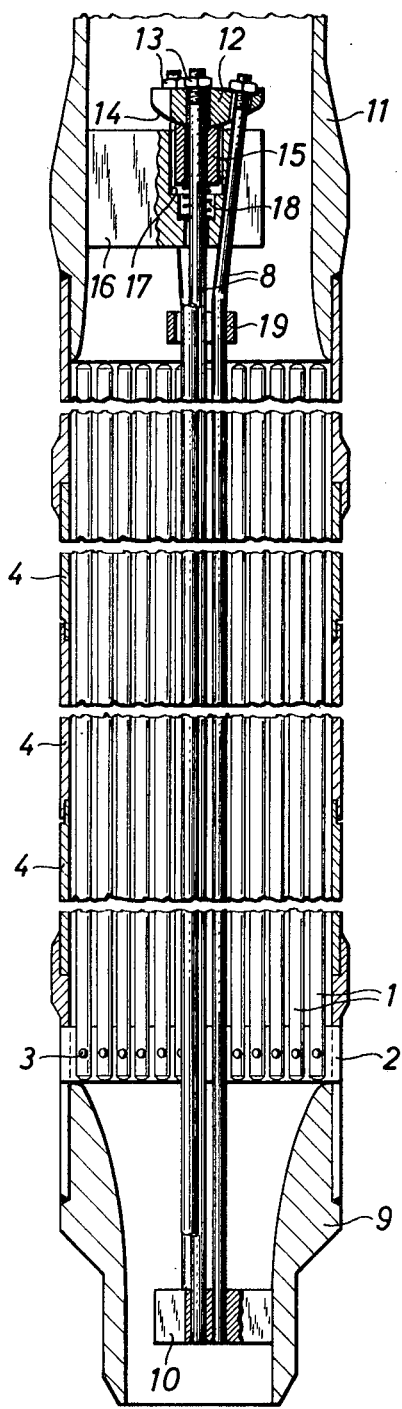
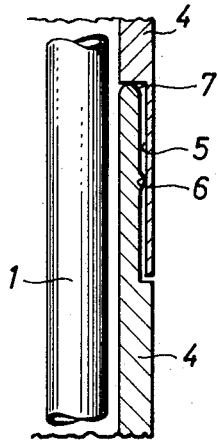
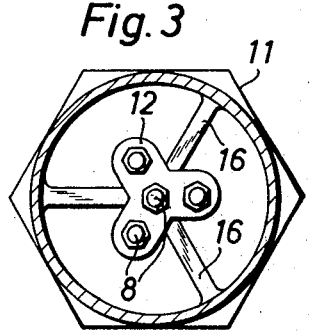
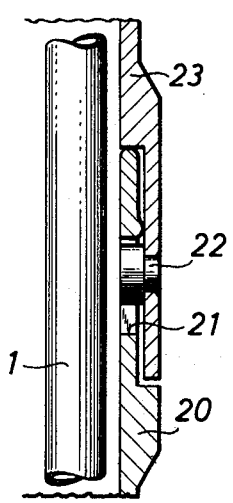

3,846,234
STACKED AND TILTABLE COMPARTMENTS FORMING A NUCLEAR FUEL ASSEMBLY
Gottfried Class, Blankenloch, and Berend Eggers, Karlsruhe, Germany, assignors to Gesellschaft für Kernforschung, Karlsruhe, Germany
Filed Mar. 8, 1971, Ser. No. 122,076
Claims priority, application Germany, Mar. 20, 1970,
P 20 10 927.7
Int. Cl. G21c 3/30
U.S. Cl. 176—78                            8 Claims

ABSTRACT OF THE DISCLOSURE

A fuel element box of the type associated with a reactor is formed of a plurality of compartments arranged in an axial series and held together by tension members. The connection between each compartment allows for a displacement of one compartment relative to an adjoining compartment.

BACKGROUND OF THE INVENTION

The invention relates to a fuel element for reactors with high and fast neutron flux, e.g., fast breeder reactors, consisting of a prismatic compartmentalized fuel element box and fuel pins combined in bundles and arranged in it.

Reactors with a high and fast neutron flux show temperature dependent swelling of the structural material at high irradiation doses which results in permanent distortions of the fuel elements because of the irregular distribution of the neutron irradiation dose and the temperature across the reactor cross section. This so-called differential swelling gives rise to major difficulties in the reactor design because the resulting unrestricted distortions may be on the order of 5 to 10 cm. at the head of the fuel element, if this statement is based on the presently employed temperatures of 500° C. and irradiation doses of $10^{23}$ nvt (neutron energies=0.1 mev.). Since these deflections result in strains on the order of several 100 to about 1000 kp. and above in the clamping planes of the reactor core, this requires very strong core clamping designs in reactor with conventional fuel element boxes. Besides a high design expenditure, these high clamping forces also entail a major mechanical stress on the walls of the box, which leads to a growing hazard of rupture, especially with increasing embrittlement of the structural material due to swelling. Moreover, in familiar types of fuel element boxes, deflections result in a displacement of the fuel in the core and during refueling, which is undesirable for nuclear reasons.

SUMMARY OF THE INVENTION

Now, it is the purpose of the invention to avoid the disadvantages mentioned above and provide a fuel element assembly the mechanical stress on which is minimized even under high differential swelling.

In the invention, this problem is solved in such a way that compartments of the fuel element box, which are located one behind the other so as to be movable, are held together along their longitudinal axis by tension members attached to the end compartments. The individual compartments of the fuel element box are assembled in such a way that each compartment partly overlaps the next one with some clearance. The tension members holding the box together consist of bars arranged within the fuel element bundle in alignment with and around the axis of the fuel element box element. These bars are welded to the fuel element box in fins in the foot of the fuel element below the fuel pin bundle attachment and, in the head piece above the fuel pin bundle, hinged so as to be movable relative to the axis of the fuel element assembly via a compression spring and a pendulum bearing to fins radially welded to the fuel element box.

In another solution of the problem, the axial compartments of the fuel element box located one behind the other so as to be movable are held together by fittings attached to the respective individual compartments in a practical embodiment of the invention, the fittings of overlapping compartments of the fuel element box are made of bolts welded in the respective individual outer compartments of the fuel element box and engaging with some clearance in the corresponding bores of the subsequent inner compartment of the fuel element box.

BRIEF DESCRIPTION OF THE DRAWINGS

FIG. 1 shows a fuel element assembly according to the invention with tension bars as holding elements, FIG. 2 shows a detail of the overlapping part of the boxes, FIG. 3 is a top view of the upper holder of the tension bars, FIG. 4 shows a detail of the overlapping part of the fuel element box compartments of a fuel element assembly without tension bars as the holding elements.

DESCRIPTION OF THE PREFERRED EMBODIMENTS

The fuel element assembly according to the invention (FIG. 1) consists of the fuel elements or pins 1 attached to strips 2 by bolts 3 and of the individual tubular compartments 4 arranged and assembled in an axially aligned series to form a fuel element box which surrounds the fuel pin bundle. In the area of the joints between the compartments of the fuel element box 4 two adjacent box compartments each overlap in such a way as to guarantee a certain amount of tiltability of these box compartments relative to each. For this purpose, there is a separating line 5 between the compartments 4 of the box at a certain distance which is bridged by a cam 6 (FIG. 2) attached to the respective inner part of the overlapping section. The end 7 of the inner compartment of the fuel element box is rounded off at the overlapping part and is in an abutting engagement with a radially inwardly extending shoulder face of the outer compartment. In this manner the two compartments 4 each can tilt relative to each other and also, with respect to the longitudinal axis of the fuel element box via cam 6 and rounding 7. The compartments 4 of the fuel element box are held together axially by tension bars 8 arranged in the middle of the fuel element within the fuel pins around the longitudinal axis and in it. In the foot 9 of the fuel element below the fuel element area the tension bars 8 are welded to that foot in fins 10, and in the head 11 of the fuel element they are flexibly anchored. This flexible arrangement serves the purpose of compensating for the differential elongation of the tension bars resulting from material swelling, so that the stress distribution over the tension bars is uniform when the fuel elements are withdrawn from the core.

The hinging effect is achieved in such a way that the ends of the tension bars 8 are bolted to an oscillating base plate 12 which plate 12 has a dishing 14 in its side facing away from the bolts 13 which dishing engages into a corresponding compensating element 15 and hence allows the plate 12 to be tilted against the compensating element 15. The base plate 12 is star-shaped (FIG. 3) in order to minimize the reduction of the free coolant flow cross section in the fuel element. Moreover, fins 16 are radially welded into the head 11 of the fuel element in the center of which, in a bore 17, the compensating element 15, which carries the base plate 12, is arranged so as to be displaceable and connected with the fins 16 by a spring 18.

A retaining ring 19 below the fins 16 around the tension bars 8 prevents the tension bars from moving away from each other when subjected to tensile forces by the suspension device.

A different design solution of the invention (FIG. 4) has no tension bars within the fuel element assembly; instead, the longitudinal forces are transmitted through the individual compartments 4 of the fuel element box. For this purpose, the wall of the box of the inner compartment of the fuel element box 20 carries bores or apertures 21 in which bolts or lugs 22 engage which are arranged around the circumference of the fuel element box and are welded or bolted to the wall of the overlapping part of the respective following box compartment 23. The separating line is designed similar to the solution in FIG. 1 so that the compartments can easily be tilted relative to each other and also, with respect to the longitudinal axis of the fuel element box.

Fixing the rigid head 11 and the foot 9 in fixing planes reduces the resultant deflections of the compartmentalized part of the box to about 10 percent of the unrestricted deflection of a rigid fuel element box at the values of material swelling mentioned initially. The reaction due to deflection of the fuel element box upon the fuel pin bundle it contains and the core structure is reduced for the same degree and the expansions resulting from the deflections are reduced, which is advantageous with respect to the lower ductility of irradiated structural material. The tension devices attached to the fuel element assembly to hold together the compartments of the fuel box permit the fuel element assembly to be handled like a conventional undivided box. In the solution according to FIG. 4, this possibility of handling is maintained also in the case of a central melting in the fuel element assembly as a consequence of a possible power excursion.

Fuel element assemblies designed according to the invention are an effective means of controlling fuel displacements in the core and of reducing the mechanical stress on the fuel element box by a considerable margin. Furthermore, they contribute towards a reduction of the core clamping forces, which greatly facilitates refueling. This also attributes a certain economic significance to the invention.

The design of the fuel element box is not limited to the embodiments shown; instead also other means of transferring the forces over the compartments of the fuel element box are possible, e.g., tension springs, sleeves, magnets, etc.

What we claim is:

1. A fuel assembly for a nuclear reactor with fast neutron flux, comprising:
   (A) a plurality of tubular compartments each having a longitudinal axis, said compartments being arranged and assembled in an axially aligned series to form an elongated tubular fuel element box having a longitudinal axis; the longitudinal axes of said tubular compartments being generally in alignment with the longitudinal axis of said fuel element box;
   (B) a plurality of fuel elements or pins disposed longitudinally in said fuel element box and forming a fuel pin bundle having a longitudinal axis;
   (C) means for interconnecting the adjoining compartments with one another; the adjoining compartments having overlapping and engaging end portions providing a radial clearance therebetween; said means for interconnecting the adjoining compartments and said clearance permitting a relative tilting movement between any two adjoining compartments such that the longitudinal axis of at least one of said two adjoining compartments tilts with respect to the longitudinal axis of said fuel element box in response to forces generated by heat expansion; and
   (D) tension means extending under tension substantially along the longitudinal axis of said fuel element box for holding said assembled compartments together, said tension means being capable of undergoing a variation in its length upon said relative tilting movement between any two of said compartments.

2. A combination as defined in claim 1, wherein said end portion of one compartment has a cam means projecting across said radial clearance and engaging the end portion of an adjoining compartment, said cam means functioning as a fulcrum for said tilting movement of one compartment relative to the adjoining compartment.

3. A combination as defined in claim 1, wherein one of said overlapping end portions has a shoulder, the other of said overlapping end portions has a rounded terminus in abutting engagement with said shoulder, said rounded terminus functioning as a fulcrum for said tilting movement of one compartment relative to the adjoining compartment.

4. The combination as defined in claim 1, further comprising a plurality of bars extending side-by-side and forming part of said tension means, one of said bars being aligned with said longitudinal axis of said fuel element box and the others being arranged therearound.

5. The combination as defined in claim 4, further comprising: a foot member secured to one end of said fuel element box; first fin means affixed to said foot member and extending substantially radially with respect to said longitudinal axis of said fuel element box, said first fin means being axially spaced from said fuel pin bundle; one end of said bars being secured to said first fin means; a head member secured to the other, axially opposite end of said fuel element box; second fin means affixed to said head member and extending substantially radially with respect to said longitudinal axis of said fuel element box; said second fin means being axially spaced from said fuel pin bundle; and means for swivellingly and self-aligningly securing the other, axially opposite end of said bars to said second fin means.

6. A combination as defined in claim 5, including spring means disposed in said second fin means for maintaining said bars under tension.

7. A fuel assembly for a nuclear reactor with fast neutron flux, comprising:
   (A) a plurality of tubular compartments each having a longitudinal axis, said compartments being arranged and assembled in an axially aligned series to form an elongated tubular fuel element box having a longitudinal axis; the longitudinal axes of said tubular compartments being generally in alignment with the longitudinal axis of said fuel element box;
   (B) a plurality of fuel elements or pins disposed longitudinally in said fuel element box and forming a fuel pin bundle having a longitudinal axis; and
   (C) joint means for securing the adjoining compartments to one another; the adjoining compartments having overlapping end portions providing a radial clearance therebetween, said joint means including a bolt or lug affixed to the end portion of one of two adjoining compartments and means defining an aperture in the end portion of the other of two adjoining compartments, said lug projecting into said aperture, said joint means and said clearance permitting a relative tilting movement between any two adjoining compartments, such that the longitudinal axis of at least one of two adjoining compartments tilts with respect to the longitudinal axis of said fuel element box in response to forces generated by heat expansion.

8. A combination as defined in claim 7, wherein in any two overlapping end portions one is an outer and one is an inner end portion, said lug being affixed to said outer end portion.

References Cited

UNITED STATES PATENTS

| | | | |
|---|---|---|---|
| 3,431,170 | 3/1969 | Lass et al. | 176—78 |
| 3,375,172 | 3/1968 | Mansson et al. | 176—78 |
| 3,308,034 | 3/1967 | Schmidt | 176—78 |
| 3,389,056 | 6/1968 | Frisch | 176—78 |
| 3,287,230 | 11/1966 | Jerkins et al. | 176—78 X |
| 3,142,627 | 7/1964 | Emerson | 176—78 |
| 3,733,252 | 5/1973 | Georges et al. | 176—78 |

FOREIGN PATENTS

| | | | |
|---|---|---|---|
| 1,029,061 | 5/1966 | Great Britain | 176—78 |

CARL D. QUARFORTH, Primary Examiner

R. GAITHER, Assistant Examiner

U.S. Cl. X.R.

176—73, 76